United States Patent [19]

Marstrand

[11] 3,790,427
[45] Feb. 5, 1974

[54] APPARATUS FOR JOINING WOODEN PARTS

[76] Inventor: Anton Julius Marstrand, General Banks vei 36, Munkvoll, Norway

[22] Filed: Dec. 8, 1971

[21] Appl. No.: 206,054

[30] Foreign Application Priority Data
Dec. 8, 1970 Norway.............................. 4696/70

[52] U.S. Cl.................. 156/544, 156/258, 156/304
[51] Int. Cl............................................. B32b 31/04
[58] Field of Search ... 156/304, 157, 258, 266, 502, 156/544, 546, 358; 144/313, 314

[56] References Cited
UNITED STATES PATENTS
2,908,600  10/1959  Nicholson....................... 156/304 X
3,126,308  3/1964  Brockerman et al............ 156/304 X
3,388,020  6/1968  Gates.............................. 156/304 X

*Primary Examiner*—William A. Powell
*Attorney, Agent, or Firm*—George H. Spencer et al.

[57] ABSTRACT

A method of and apparatus for joining parts of wooden material into a beam. The method involves applying oppositely directed longitudinal forces to a beam composed of two parts of wooden material having complementary profiled ends. The longitudinal forces press the profiled ends towards one another to remove excessive bonding agent from between the ends. The apparatus includes spaced apart beam engagable devices which move parts of wooden material along a defined path. The spaced apart beam engagable devices are coupled respectively to a driving device and a driven device. The driven device is part of an energy converting circuit which supplies energy to the driving device.

10 Claims, 2 Drawing Figures

PATENTED FEB 5 1974 3,790,427

APPARATUS FOR JOINING WOODEN PARTS

BACKGROUND OF THE INVENTION

This invention relates to a method of and an apparatus for joining parts of wooden material into a beam. The invention relates, more particularly, to a method of and apparatus for joining parts of a wooden material into a beam in which a bonding agent is applied to at least one of two complementary profiled ends of wooden parts which are pressed together by applying a first force in a first longitudinal direction of the beam from a first set of rotary members engaging the beam and by applying a second oppositely directed force by a corresponding second set of rotary members. The two sets of rotary members each are a pair of rollers or a pair of endless belts or combinations thereof.

In joining of parts of wooden material into a beam, the two parts of wooden material should be pressed together to remove excessive bonding agent from the joint formed between their profiled ends. Thus it is important that no aggregations of liquid bonding agent under pressure are present when the force is removed. The pressure necessary to effect joining wooden parts of large size is high, in the order of 1,000 kiloponds. It is further desirable to operate with as high a working speed as possible.

To achieve satisfying results a substantial transmission of energy is necessitated. Substantial energy is transmitted from a first set of beam engaging members to the beam and from the beam to the second set of beam engaging members. A portion of the energy supplied is transferred into heat by friction, particularly between the sets of beam engaging members and the beam, while the remaining portion of the energy normally is converted into heat in the second set of beam engaging members remotely from the beam. To decrease the energy consumption it is known to activate the second set of beam engaging members, i.e., the braking set, intermittently and only when a joint is present between the first set and the second set of beam engaging members. This prior art arrangement, however, causes severe mechanical transients to be produced which are disadvantageous to the apparatus, and may lead to undesirable vibrations in the beam.

SUMMARY OF THE INVENTION

It is an object of the present invention to provide a method of joining parts of wooden material into a beam which can be conducted continuously with low energy loss.

It is another object of the present invention to provide a method of joining parts of wooden material into a beam which does not produce severe and disadvantageous mechanical transients.

It is a further object of the present invention, to provide an apparatus for joining parts of wooden material into a beam which can be operated continuously and with high efficiency.

It is an additional object of the present invention to provide an apparatus for joining parts of wooden material into a beam which is free of severe and disadvantageous mechanical transients.

The above-mentioned method objects, as well as others which will become apparent from the text which follows, are accomplished by providing in a method of joining parts of wooden material the steps of providing parts of wooden material with complementary profiled ends, applying a bonding agent to at least one of the profiled ends and pressing together the profiled ends by applying respectively oppositely directed longitudinal forces to the beam from spaced apart first and second beam engaging means. The method further includes driving the first beam engaging means from a driving member driving a driven member from the second beam engaging means, supplying energy from the driven member to the driving member, and supplying loss compensating and control energy to said driving member.

The above-mentioned apparatus objects, as well as others which will become apparent from the text which follows, are accomplished by providing in an apparatus for joining parts of wooden material into a beam spaced apart first and second beam engagable means for moving the parts of wooden material along a defined path under the influence of a stressing force. A driving device is arranged for driving the first beam engagable means. An energy converting circuit having an output is coupled to the second beam engagable means. The output from the energy converting circuit is coupled to the driving device for feeding energy obtained from the second beam engagable means to the driving device.

According to an exemplary embodiment of the present invention first and second sets of rotary beam engaging members are operatively connected to a driving device and a driven device respectively. The driving device and the driven device are parts of an energy converting system wherein the driven device delivers energy transferred to said driving device which is further fed from an energy source which supplies compensating and control energy.

An apparatus incorporating an exemplary embodiment of the present invention includes at least two sets of rotary engaging members, e.g., nip rollers or belts or combinations of rollers and belts arranged in spaced relationship to define a path of movement for the parts of wooden material to be joined into a beam and for moving the parts of wooden material along the path under the influence of a stressing force by driving and braking the first and the second set of rotary engaging members, respectively. The second set of beam engaging members is coupled to an energy converting circuit for feeding the converted braking energy to a driving device which drives the first set of beam engaging members.

A significant advantage of the present invention is that the energy requirement is decreased due to the utilization of the energy gained by braking and that parts of the apparatus, e.g., the connection to an external energy source, may be sized for handling lower energy levels.

DESCRIPTION OF THE PREFERRED EMBODIMENTS

Figure 1:
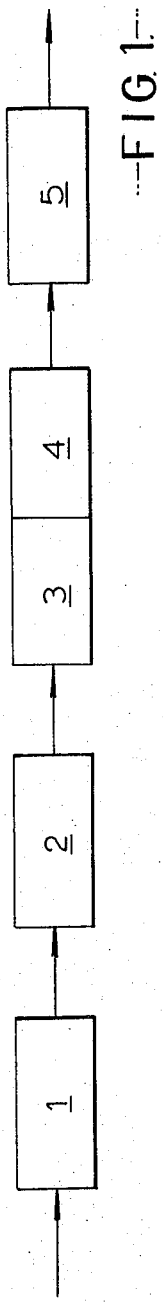
FIG. 1 is an operational flow diagram of a method of joining parts of wooden material into a beam.

Referring to FIG. 1, in order to form parts of wooden material into a beam ends of the parts of wooden material to be joined are milled, by milling steps indicated at 1 to have a suitable profile, e.g., a saw toothed profile. Then a suitable bonding agent, e.g., a glue is applied, by an applying step or steps indicated at 2, to one or both of the milled surfaces of the parts of wooden material to be joined, preferably by spraying or brushing. Any suitable wood bonding glue may be utilized, e.g., a phenolic resin composition.

The ends of the parts are then brought in engagement, by a joining step indicated at 3, and pressed together, by a pressing step indicated at 4, to remove excessive bonding material. This pressing is maintained for a period necessary to make this removal of excessive bonding material from between the milled ends of the parts of wooden material complete. Depending on the kind of bonding material, the bonding material may be cured naturally, i.e., without supply of heating energy by a material curing step indicated at 5, or be heated, by a heating step as indicated alternatively at 5, after the pressing step. Alternatively the heating step may be effected during the pressing step or also started even before applying the bonding material.

After the curing step the joined beam is cut into suitable lengths. Thus it is possible to utilize residues of wood otherwise exhausted, the joined wooden beam having strength properties close to a corresponding natural wooden beam.

Figure 2:
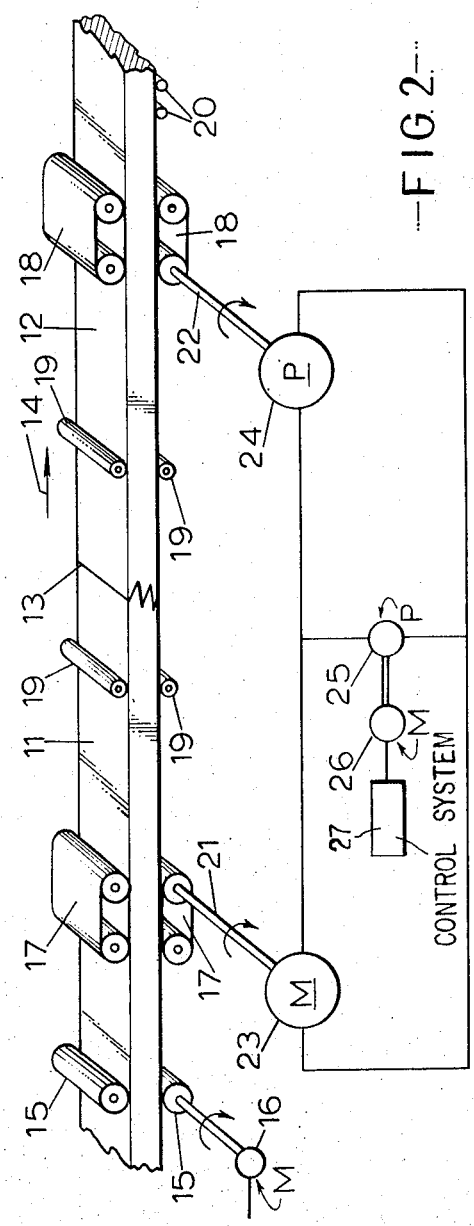
FIG. 2 is a schematic diagram of an apparatus for joining parts of wooden material into a beam according to the present invention.

Referring to FIG. 2, two parts of wooden material 11 and 12 of shaped material having profiled ends are shown being joined in a joint 13. The parts of wooden material 11 and 12 are moved in the direction of an arrow 14.

At the input end of the apparatus, shown in FIG. 2, a pair of nip rollers 15 for moving the parts of wooden material 11 and 12 is arranged. One of the nip rollers 15 is driven by a suitable motor 16. The nip rollers 15 may be journaled in suitable bearings (not shown). In spaced relationship downstream from the nip rollers 15 two pairs of endless belts, 17 and 18 respectively are arranged to define a path of movement for the parts of wooden material 11 and 12 to be joined. The endless belts 17 and 18 of each pair are arranged on opposite sides of the path of movement with their axes perpendicular to the direction of movement as shown by the arrow 14.

In the embodiment shown in FIG. 2 the axes of the pairs of endless belts 17 and 18 and the nip rollers 15 are parallel. The sets of endless belts 17 and 18 may, however, be arranged to seize the parts of wooden material 11 and 12 to be joined on different sides, particularly if a beam with a square cross section is to be handled. The nip rollers 15 and the endless belts 17 and 18 are preferably made of steel with a covering or a structured surface which increases the friction between themselves and the parts of wooden material 11 and 12 handled.

Between the pairs of endless belts, 17 and 18 respectively, two pairs of workpiece supporting rollers 19 are arranged. The nip rollers 15, the endless belts 17, the supporting rollers 19, and the endless belts 18 form a path of movement with a uniform gap. These members are journaled to permit an adjustment of the gap to adapt the apparatus for handling different sizes of material. Such adjustment means are commonly known and are not shown in FIG. 2.

The gap of the nip rollers 15 and of the sets of endless belts 17 and 18 is adjusted to provide a pressure against the parts of wooden material 11 and 12 to be handled and thus to increase the frictional force. The supporting rollers 19, which are optional and may be omitted, have the purpose of preventing breaking of beams with small thickness. Beam carrying rollers 20 are provided on an output end of the apparatus.

One of the rollers (unnumbered) carrying each set of endless belts, 17 and 18 is provided with a shaft, 21 and 22 respectively, operatively connected to a hydraulic motor 23, and to a hydraulic pump 24, respectively.

The motor 23 and the pump 24 are connected with pipes (unnumbered), forming a hydraulic circuit. In this circuit a hydraulic pump 25 driven by a suitable motor 26 is arranged in parallel with the pump 24. A suitable control system 27 is provided for energizing the motor 26. The control system 27 is operatively arranged to supply a predetermined amount of power to the motor 26. Additionally the hydraulic circuit comprises various conventional parts, e.g., tanks, safety valves, and control valves, not essential to the principle of the system and which will be obvious to a man skilled in the art.

For ease of understanding the system described may be thought to have two modes of operation:

a. an "idling" mode in which the parts of wooden material 11 and 12 are moved without significant stressing or pressing and b. a "pressing" mode in which a force is transferred between the sets of endless belts 17 and 18 through the beam formed by the parts of wooden material 11 and 12.

The energy supplied to the system may be divided into:

a. energy corresponding to idling losses, including the idling losses in the parts engaging the beam and the idling losses of the hydraulic circuit, and b. energy corresponding to that necessary to provide the pressing forces being composed of a portion determined by the net force transferred between the sets of endless belts 17 and 18 and the velocity of movement, and a portion consumed to remove excessive bonding agent (i.e., to seal the joint) and to cover increased frictional losses, e.g., due to slipping between the endless belts 17 and 18 and the parts of wooden material 11 and 12. In the first mode of operation, "idling," the losses are supplied by the motor 16 driving the nip rollers 15. Thus the motor 16 should be dimensioned to drive the apparatus, including the pump 24 and the motor 23 on idling. In this case the shaft 22 will transfer only the energy necessary to replace the losses in the hydraulic circuit. In the second mode of operation "pressing," the motor 26 drives the pump 25 which delivers its output energy to the motor 23, introducing a differential pressure in the hydraulic circuit. The motor 23 is supplied energy determined by the differential pressure and the total output of the pumps 24 and 25. A force resulting from this energy less the additional frictional losses and the loss due to the creeping of the joint 13 is thus transferred through the beam formed by the parts of wooden material 11 and 12 between the two sets of endless belts 17 and 18.

The motor 23 is dimensioned according to the highest energy to be transferred to a beam formed by the parts of wooden material 11 and 12, including the energy necessary to provide the pressing force and the loss increase. Correspondingly the pump 24 is dimensioned to supply motor energy less the loss increase between the motor 23 and the pump 24. The motor 26 supplies energy corresponding to the increased losses.

To operate the motor 26 the control system 27 is set to maintain a predetermined, adjustable pressing force as needed. Such a control system may be of a kind known to a man skilled in the art and shall not be described herein. It is convenient to operate the pump 25 with a uniform, adjustable pressure.

In an alternative embodiment, not shown, the motor 16 and the nip rollers 15 are omitted, using the motor 23 also to move the beam. In this case the motor 26 and the pump 25 are dimensioned to supply also the idling losses.

Within the scope of the invention the embodiments shown and described herein may be further modified. Thus the sets of endless belts 17 and 18 may be replaced by nip rollers. The hydraulic system may be replaced by an electrical or a mechanical one. Instead of a single motor 23 and a single pump 24, compound units may be utilized. A possible mechanical system, which may be used to replace the hydraulic circuit used in the embodiment shown in FIG. 2, may be constituted as a differential transmission, as used for example, in automobiles, with the motor 26 acting at the driving shaft and the two output shafts coupled to the axles 21 and 22, respectively. An electrical system, which is an analogue of the mechanical system, may be also substituted for the hydraulic circuit.

It will be understood that the above description of the present invention is susceptible to various modifications, changes and adaptations, and the same are intended to be comprehended within the meaning and range of equivalents of the appended claims.

I claim:

1. In an apparatus for joining parts of wooden material into a beam, the apparatus including spaced apart first and second beam engagable means defining a path of movement for the parts of wooden material for moving the parts of wooden material under the influence of a stressing force, the improvement comprising, in combination:
    a. driving means for driving said first beam engagable means,
    b. energy converting circuit means having an output means,
    c. means for coupling said second beam engagable means to said energy, converting circuit means, and
    d. means coupling said output means to said driving means for feeding energy obtained from said second beam engagable means to said driving means.

2. An arrangement as defined in claim 1 wherein said first and second beam engagable means comprise respectively a first set of rotary beam engagable means and a second set of rotary beam engagable means.

3. An arrangement as defined in claim 2 wherein said first set of rotary beam engagable means and said second set of rotary beam engagable means each comprises respectively a first set of rollers and a second set of rollers.

4. An arrangement as defined in claim 2 wherein said first set of rotary beam engagable means and said second set of rotary beam engagable means each comprises respectively a first set of belts and a second set of belts.

5. An arrangement as defined in claim 2 wherein said first set of rotary beam engagable means and said second set of beam engagable means each comprises respectively a first combination set of belts and rollers and a second combination set of belts and rollers.

6. An arrangement as defined in claim 1 wherein said energy converting circuit means includes an energy source means for supplying compensating and control energy to said driving means.

7. An arrangement as defined in claim 6 wherein said energy converting circuit means comprises hydralic pump means coupled to said second beam engagable means for delivering fluid working medium to said driving means, said driving means being hydralic motor means; and wherein said energy converting circuit means includes an energy source means for supplying compensating and control energy to said hydralic motor means, said energy source means comprising a second hydralic pump means.

8. An arrangement as defined in claim 7 further comprising additional motor means coupled to said second hydralic pump means for producing an adjustable differential pressure in the hydralic circuit which includes the first said hydralic pump means, said hydralic motor means and said second hydralic pump means.

9. An arrangement as defined in claim 8 further comprising control means coupled to the last said motor means.

10. An arrangement as defined in claim 1 further comprising separate beam engagable means for feeding the beam without significant stressing.

* * * * *